Nov. 26, 1957  C. D. FORTE  2,814,134
LAND CLEARING IMPLEMENT
Filed Aug. 3, 1953  3 Sheets-Sheet 3
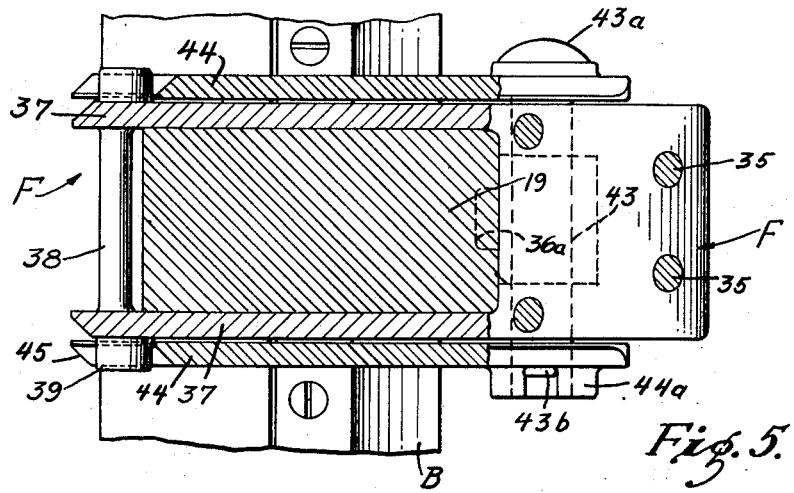
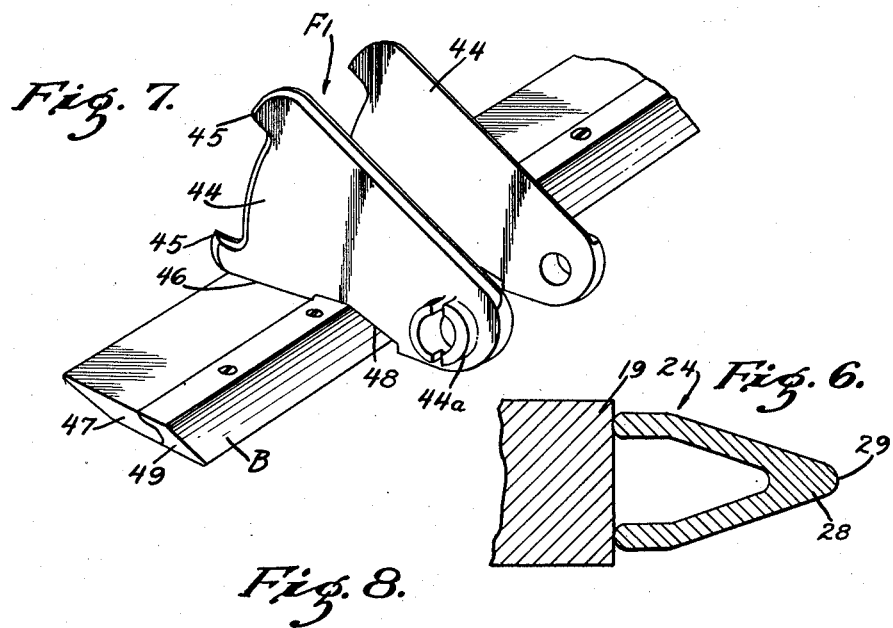
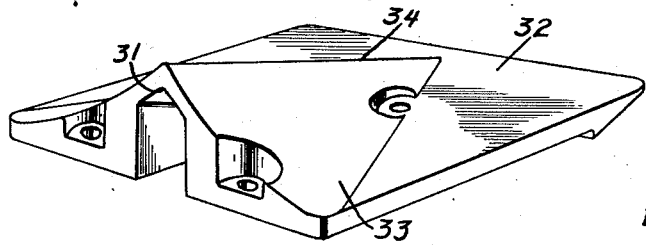
INVENTOR.
Carl D. Forte
BY
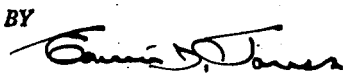
Attorney

United States Patent Office 2,814,134
Patented Nov. 26, 1957

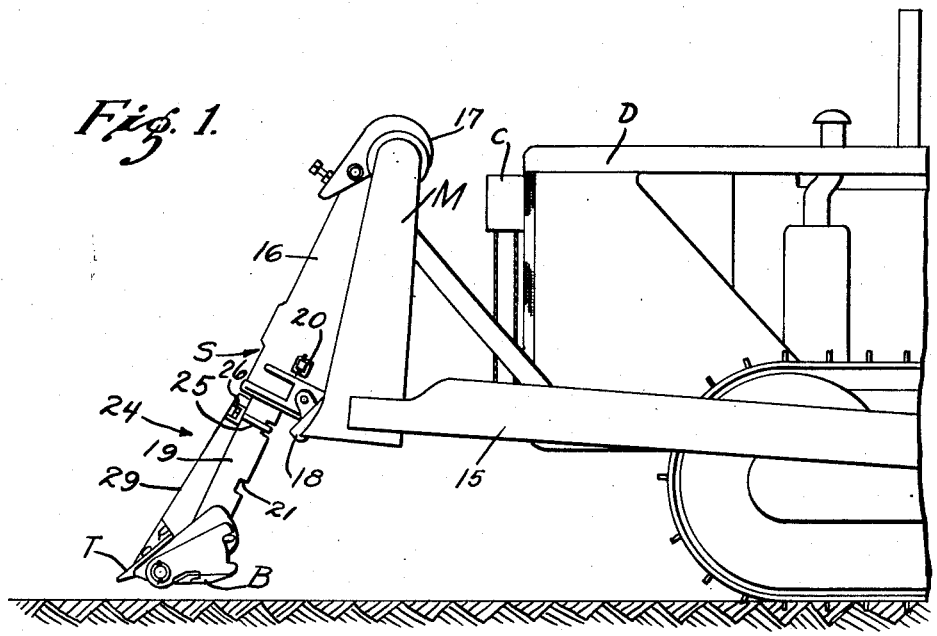
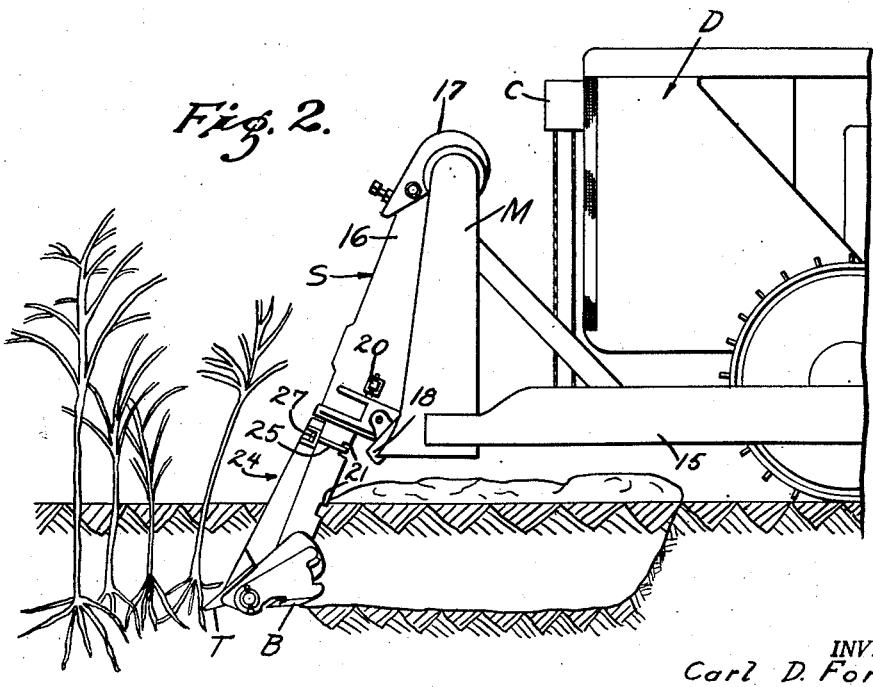

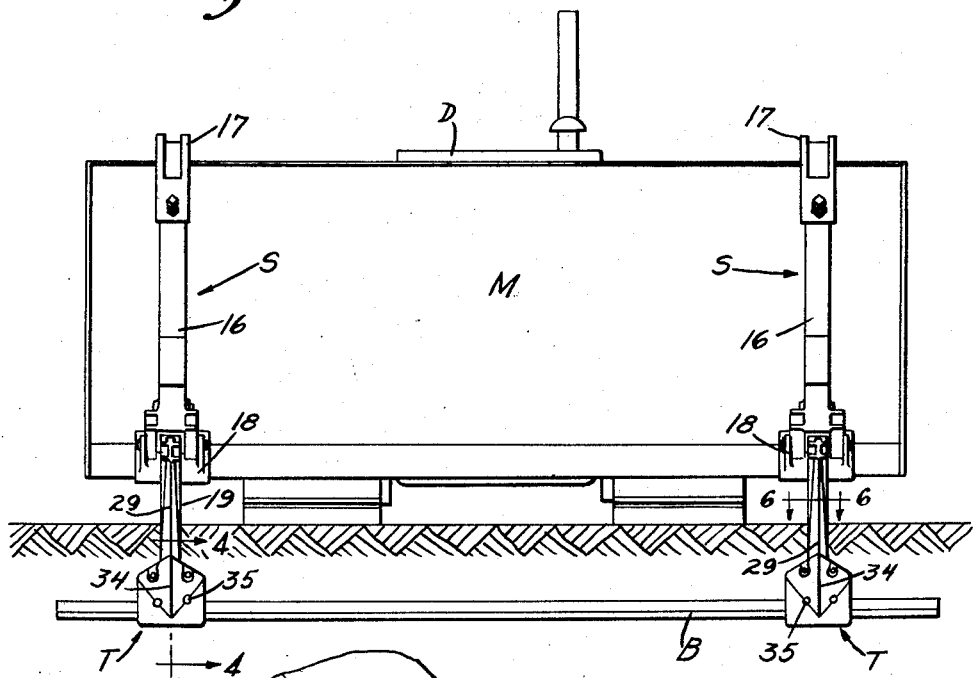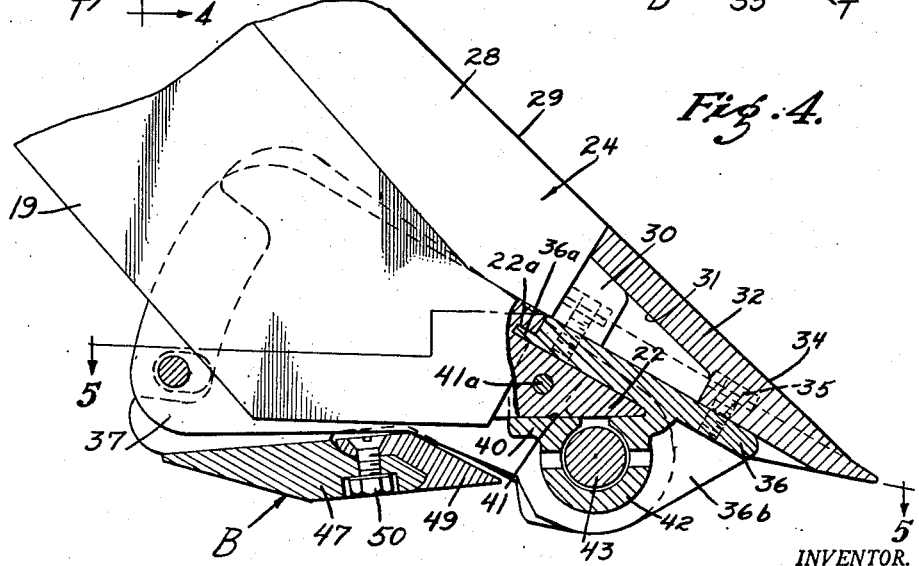

2,814,134

LAND CLEARING IMPLEMENT

Carl D. Forte, Los Angeles, Calif.; Helen A. Forte, administratrix of said Carl D. Forte, deceased, assignor to said Helen A. Forte Application August 3, 1953, Serial No. 372,048

12 Claims. (Cl. 37—2)

My invention relates to and has for a purpose the provision of an implement which is preferably attachable to and operable by the moldboard of a dozer for clearing virgin land of trees, brush, and other forms of wild vegetation, preparatory to cultivation of such land or for other purposes.

It is also a purpose of my invention to provide a land clearing implement which embodies a cutting blade adapted to be mounted on a dozer moldboard below and in advance thereof, and digger teeth mounted ahead of the blade so that under forward movement of the dozer the teeth are caused to penetrate and loosen the ground, and in so doing causing the blade to penetrate the ground to a depth at which it functions to cut the roots of trees and other vegetation to free and thus allow the trees to be removed from the ground and collected on the moldboard for movement to a point of disposal by burning or otherwise.

Another purpose of my invention is the provision of a land clearing implement in which the cutting blade is mounted to automatically occupy and move in a plane paralleling the surface of the ground so as not to impede its forward movement through the ground in the cutting of roots, and irrespective of the angle of penetration of the digger teeth.

Another purpose of my invention is the provision of a land clearing implement which is associated with the moldboard of a dozer so that the earth loosened by the teeth and the blade, is free to pass beneath the moldboard, and, hence, not thereinto, leaving the moldboard free to receive and move the severed vegtation to a point of disposal.

A still further purpose of my invention is the provision of a land clearing implement in which vertically adjustable supports are attachable to the moldboard, and upon which the digger teeth and cutting blade are mounted, the digger teeth and parts of the supports having cutting edges substantially vertically disposed which operate to cut the roots of the vegetation in vertical paths as distinguished from the horizontal path of cutting of roots by the blade, thereby insuring severance of all roots in order that the vegetation may be removed from the ground and collected for disposal. In addition to being provided with cutting edges, both the digger teeth and parts of the supports are formed with inclined surfaces which operate to discharge the earth to opposite sides thereof, and thus prevent it from being carried upwardly onto the moldboard.

I will describe only one form of land clearing implement embodying my invention, and in association with the moldboard of a bulldozer, and will then point out the novel features thereof in the claims.

In the accompanying drawings:

Fig. 1 is a view showing in side elevation one form of land clearing implement embodying my invention and mounted on the moldboard of a bulldozer.

Fig. 2 is a view similar to Fig. 1 showing the implement lowered by the moldboard into operative position for the cutting of roots of vegetation.

Fig. 3 is a view showing the implement in front elevation on the bulldozer moldboard and in the operative position corresponding to Fig. 2.

Fig. 4 is an enlarged vertical sectional view taken on the line 4—4 of Fig. 3.

Fig. 5 is a top plan sectional view taken on the line 5—5 of Fig. 4, with the digger tooth omitted.

Fig. 6 is an enlarged sectional view taken on the line 6—6 of Fig. 3.

Fig. 7 is a fragmentary perspective view of the cutting blade showing one of the mounting brackets.

Fig. 8 is a detailed perspective view of one of the digger teeth.

Referring more particularly to the drawings, the implement of my invention essentially consists of a pair of digger teeth T, a root-cutting blade B and a pair of supports S by which the teeth and blade are mounted on the moldboard M of a conventional bulldozer D, it being understood that the implement is attachable to the moldboard of a dozer of any construction wherein it is supported by pivoted arms 15 to allow, through operation of a conventional cable mechanism C, lowering of the moldboard to cause the implement to penetrate the ground, or elevating thereof to withdraw the implement from the ground as is required to move the dozer from place to place to initiate a new root-cutting operation.

Each support S is, in part, of substantially the same construction as the rooter disclosed in my Patent No. 2,346,567 issued April 11, 1944, not only because the rooter can be utilized in pairs to mount the implement on the moldboard, but when the implement is not used it may be detached from the rooters and the latter used as intended.

Each support S is shown as comprising a tubular housing member 16 which is firmly attached in substantially vertical position at the forward side of the moldboard M and to the upper and lower edges thereof by a clamping bracket 17 and a saddle 18. A shank member 19 is telescopically received in the lower end of the housing member 16 and is held in various positions of longitudinal adjustment by a cross pin 20 engaged in any one of a series of notches 21 in the shank member. The lower end of the shank member 19 is formed with a tapered tang 22 upon which a rooter point (not shown) is adapted to be secured when the structure is used as a rooter, and the lower end of the shank member may be formed with a recess 22a to receive a lip (not shown) on the rooter point to aid in securing the point against transverse movement on the tang.

In addition to this rooter construction, each support S includes a mounting bar 24 which, at its upper end, is secured to the forward side of the shank member 19 by a U-bolt 25 engaging in one of the notches 21 and having its ends extended through the wings of a bracket 26 cast integral with the bar, and secured thereto by nuts 27. As best shown in Fig. 6, the bar 24 is of V-form in cross section to provide at its forward side surfaces 28 oppositely inclined from its longitudinal center, and forming at the junction thereof a blade or cutting edge 29 which is employed for the cutting of roots.

The lower end of the bar 24 is formed with a tapered head or tang 30 which fits within a tapered socket 31 of a point 32 of the tooth T, better shown in Fig. 8 as provided with a raised portion shaped to form surfaces 33 oppositely inclined and providing at the junction of the two a root-cutting blade or edge 34 which is aligned longitudinally with the bar blade 29.

By means of screws 35 the tooth point 32 is secured to the upper side of a plate 36 which serves to close the lower side of the socket 31 as the latter receives the tank 30. To adapt the plate 36 to this particular rooter shank, it is formed with a lip 36a which fits in the recess 22a. The plate 36 is formed with downturned flanges 36b at its side edges, and the plate with its flanges form part of a fixed bracket indicated generally at F, and which includes a pair of arms 37 formed integral with the plate and the flanges and spaced apart to receive therebetween and embrace the lower end of the shank member 19. The free ends of the arms 37 are rigidly connected to each other by a cross pin 38, and on the outer sides of these arm ends lugs 39 are formed.

The bracket F also includes a lower plate 40 to which the plate 36 is inclined upwardly so as to form therebetween a tapered socket 41 in which the tank 22 is snugly received and a pin 41a extends through the flanges 36b and the tang for locking the two to each other. The plate 40 is formed on its underside with a sleeve 42 which bridges the flanges 36b and receives a pivot pin 43 for mounting a movable bracket generally designated at F1, on the fixed bracket F. The pin 43 is formed with a head 43a on one end and provided with a cotter pin 43b on the other end to removably secure the pin in the sleeve 42, the cotter pin being received in a recessed collar 44a fixed on one of the arms of the bracket F1.

The movable bracket F1 is best shown in Fig. 7 as comprising a pair of identically shaped arms 44, each in the form of a longitudinally tapered plate rounded at its narrow end and recessed at its wide end to provide spaced shoulders 45 which serve as stops. The lower edges of the arms have portions 46 welded to the body 47 of the blade B and recessed portions 48 accommodating the cutting edge 49 of the blade which is removably secured thereto in an interfitting arrangement by bolts 50, as shown in Fig. 4.

The arms 44 as welded to the blade body 47 extend transversely thereof and are spaced apart to receive the plate 36 and the arms 37 therebetween (see Fig. 5), the narrow ends of the arms 44 being bored to provide ears through which the pin 43 extends to pivotally mount the bracket F1 for rocking movement as a unit on the fixed bracket F. The association of the brackets is such that the lugs 39 are disposed between the stops 45 so that the latter function to limit rocking movement of the bracket F1 on the bracket F. Since the blade B is carried by the two brackets F1 when considering both of the supports S, it will be clear that the blade is mounted for limited rocking movement about the pins 43 as a center.

With the two supports S secured on the moldboard M in the positions shown in Figs. 1, 2 and 3, the digger teeth T are fixedly mounted in positions depending from the lower edge of the moldboard and at suitable angles thereto for digging, while the blade B is positioned to the rear of and at substantially the same level as the teeth with its pivot points 43 in advance of the blade.

In operation of the implement as so applied to the tractor, the moldboard, through operation of the cable mechanism C, is lowered from the position shown in Fig. 1 to that shown in Figs. 2 and 3, wherein the lower edge of the moldboard is considerably spaced from the surface of the ground. Under such lowering movement, the entire weight of the moldboard and the supports S is imposed on the teeth T causing them to penetrate the ground at an angle and to a depth depending upon the position to which they have been adjusted on the moldboard. Thus, as the tractor moves forwardly the teeth are caused to dig into and loosen the earth about the roots of any trees, brush or other vegetation in their paths. It will of course be understood that the teeth also cut some of the roots by virtue of their relatively sharp forward edges.

As the teeth penetrate the ground the blade B is drawn into the earth to substantially the same level as the teeth, and because of the pivotal mounting of the blade coupled with the fact that a pulling force is exerted by the teeth on the blade rather than a pushing force, the blade is automatically swung to a position in which its cutting edge moves in a path parallel to the surface of the ground as it proceeds forwardly. Thus, as the tractor advances the teeth operate to loosen the earth about the vegetation, while the blade cuts the roots and thus frees the vegetation so that it falls onto and is thus collected by the moldboard to be moved to a point of disposal.

During this root-cutting operation the cutting edges 34 of the teeth T and the cutting edges or blades 29 of the bars 24 move in vertical paths and thus operate to cut those roots positioned horizontally or at slight angles thereto, as distinguished from the horizontal cutting action of the blade B which severs roots positioned vertically or at slight angles thereto. Thus through the combined cutting action of the blade and the aforesaid cutting edges, all vegetation in the path of the implement is severed at its roots so as to completely free it for removal and collection by the moldboard. Accordingly, it will be manifest that a plot of virgin land even if entirely covered with wild vegetation, can be completely and rapidly cleared of such vegetation through the repeated use of my implement.

Since in the operative position of the implement the moldboard is maintained spaced from the surface of the ground, the earth loosened and elevated by the implement passes beneath the moldboard and is thus prevented from passing onto the moldboard to additionally load and thus impede its forward movement. Moreover, earth attempting to slide upwardly on the teeth and the mounting bars 24 and thence onto the moldboard, falls to opposite sides thereof by reason of the inclined surfaces 33 and 28, and thus earth is prevented from so accumulating on the moldboard.

An important feature of my implement is the manner in which the blade B is pivotally mounted to cause it to automatically assume a position in which it travels in a path beneath and parallel to the surface of the ground since if permitted to deviate upwardly from such path it would ultimately move out of the ground, and if permitted to deviate downwardly from such path it would stop further movement of both the implement and the tractor.

Because my implement is applicable to moldboards of various inclinations, and the supports S are adjustable to position the teeth T at various earth digging angles, the blade B cannot be made stationary on the supports under such varying conditions and still travel through the earth in a plane parallel to the surface of the ground. By mounting the blade for pivotal movement however, and so that it is pulled forwardly from its point of pivotal mounting, the blade is caused to automatically occupy the required position irrespective of the digging angle of the teeth.

Although I have herein shown and described only one form of land clearing implement embodying my invention, it is to be understood that various changes and modifications may be made therein without departing from the spirit of the invention and the spirit and scope of the appended claims.

What I claim is:

1. A land clearing implement, including: a pair of supports; means for attaching the supports to the moldboard of a dozer; each support having a shank provided at its lower end with a tang, a fixed bracket having a socket receiving the respective tang, and a sleeve, a bar fixed to said shank and provided at its lower end with a head; a tooth affixed to said bracket and coacting therewith to form a socket receiving said head; a pin in said sleeve; a movable bracket pivotally mounted on said pin; and a blade fixed transversely to both of the movable brackets.

2. A land clearing implement, including: a pair of supports; means for attaching the supports to the moldboard of a dozer; each support having a shank provided at its lower end with a tang, a fixed bracket having a socket receiving the respective tang, and a sleeve, a bar fixed to said shank and provided at its lower end with a head; a tooth affixed to said bracket and coacting therewith to form a socket receiving said head; a pin in said sleeve; a movable bracket pivotally mounted on said pin; a blade fixed transversely to both of the movable brackets; and coacting means on the fixed and movable brackets for limiting pivotable movement of the movable brackets.

3. A land clearing implement as embodied in claim 2, wherein said coacting means comprises spaced stops on the movable brackets, and cross pins on the fixed brackets.

4. In combination: a moldboard for dozers; teeth fixed to and depending from the moldboard at the forward side thereof; an elongate blade pivoted horizontally on and connecting the teeth for free swinging vertical movement about an axis trailing and pulled by the teeth in their forward movement; and coacting means on the teeth and the blade for so limiting swinging movement of the blade as to cause it to occupy a substantially horizontal operating position when pulled by the teeth.

5. In combination: a moldboard for dozers; teeth; means for mounting the teeth of the moldboard which is adjustable to vary the digging angle of the teeth; a blade, means pivotally mounting the blade on the teeth whereby the blade will automatically swing under forward movement of the teeth in the ground and irrespective of the digging angle thereof, to a position in which it travels in a path beneath the substantially parallel to the surface of the ground; and cooperating stops on the blade and the teeth for limiting swinging movement of the blade to insure its occupying the aforesaid position.

6. In combination: digger teeth; means for so mounting said teeth on a moldboard that they project forwardly and downwardly therefrom at spaced points along the length thereof; a blade; means pivotally mounting the blade on said teeth so as to bridge the latter and to swing about a horizontal axis located forwardly of the blade and rearwardly of the leading edges of said teeth so that under forward movement of said teeth when in the ground the blade will be pulled by the teeth so as to cause it to swing to a substantially horizontal position; and means limiting swinging movement of the blade to insure it occupying the aforesaid position.

7. In combination: a pair of digger teeth; means securing said teeth to a moldboard at an elevation below and in advance of the bottom edge thereof; an elongate blade extending longitudinally of the moldboard; and pivot means so mounting the blade on said teeth that under forward movement of said teeth in the ground, the blade automatically assumes a position to travel in a path beneath and substantially parallel to the surface of the ground.

8. In combination: a pair of digger teeth; means securing said teeth to a moldboard in spaced relation lengthwise thereof; brackets fixed to and extending rearwardly from said teeth; a blade; other brackets fixed to the blade transversely thereof and extending forwardly therefrom; and means pivotally connecting the forward portions of the first mentioned brackets with the forward portions of said other brackets, for swinging movement of said other brackets about a horizontal axis.

9. In combination: a moldboad for dozers; supports fixed transversely to and depending from the lower edge of the moldboard; teeth fixed to the lower ends of said supports; brackets fixed to said supports; movable brackets horizontally pivoted on the fixed brackets at corresponding points rearwardly of said teeth; a root-cutting blade fixed to the movable brackets rearwardly of said pivot points so that the blade is free to swing vertically thereabout; and coacting means on said fixed and movable brackets for limiting pivotal movement of the movable brackets to control transverse tilting movement of said blade about said pivot points.

10. In combination: a digger tooth; a horizontal blade having a cutting edge; means for pivotally mounting the blade on said tooth with its cutting edge a substantial distance rearwardly of the tooth for free swinging movement and so as to be pulled by the tooth when the latter is advanced in and along the ground; and coacting means on said tooth and the blade for limiting pivotal movement of the blade to a predetermined position on said elements when pulled by the latter.

11. In combination: digger teeth; means securing said teeth to a moldboard in laterally spaced relation along the length of the moldboard, in depending relation to the latter and forwardly thereof; a blade; means for so swingingly coupling the blade to and at a substantial distance rearwardly of the leading edges of said teeth as to be pulled by the latter when advanced by the moldboard; and means for so limiting movement of the blade on said teeth that when the latter are advanced and digging, the blade will, under the pull exerted thereon by said teeth, be caused to penetrate the ground and travel in a path below and substantially parallel to the surface of the ground.

12. In combination: digger teeth; means securing said teeth to a moldboard in laterally spaced relation along the length thereof, in depending relation thereto and forwardly thereof; a blade; means pivoting the blade on said teeth to swing on an axis in advance of the forward edge of the blade and behind the leading edges of the teeth; and means for limiting pivotal movement of the blade on said teeth.

References Cited in the file of this patent

UNITED STATES PATENTS

| | | |
|---|---|---|
| 39,118 | Clemens | July 7, 1863 |
| 2,309,223 | Staring | Jan. 26, 1943 |
| 2,322,432 | Forte | June 22, 1943 |
| 2,573,921 | McNamara | Nov. 6, 1951 |
| 2,615,262 | Reid | Oct. 28, 1952 |
| 2,625,870 | Peacock et al. | Jan. 20, 1953 |
| 2,716,823 | Mullin | Sept. 6, 1955 |

OTHER REFERENCES

Mullin, brochure, complete disclosure printed January 16, 1950; illustrations Nos. 1, 2 and 3 drawn by Henry A. Mullin, Jr., and dated October 20, 1949, relied on.